(12) United States Patent
Kaufman et al.

(10) Patent No.: US 8,392,252 B2
(45) Date of Patent: Mar. 5, 2013

(54) SCIENTIFIC TARGETING FOR ADVERTISEMENT AND CONTENT SELECTION, DISTRIBUTION, AND CREATION

(75) Inventors: Scott M. Kaufman, Marina del Rey, CA (US); Jennifer L. Kushell, Marina del Rey, CA (US); Russell J. Watson, Oswego, IL (US); Joshua T. Hoppes, Santa Ana, CA (US); Christopher J. Gooley, Los Angeles, CA (US); William Tam, Los Angeles, CA (US)

(73) Assignee: Scientific Targeting LLC, Marina Del Rey, CA (US)

( * ) Notice: Subject to any disclaimer, the term of this patent is extended or adjusted under 35 U.S.C. 154(b) by 133 days.

(21) Appl. No.: 13/039,767

(22) Filed: Mar. 3, 2011

(65) Prior Publication Data

US 2011/0218850 A1 Sep. 8, 2011

Related U.S. Application Data

(60) Provisional application No. 61/310,264, filed on Mar. 3, 2010.

(51) Int. Cl.
*G06Q 30/00* (2012.01)
*G06Q 10/00* (2012.01)

(52) U.S. Cl. ............... 705/14.41; 705/14.49; 705/14.52; 705/14.53; 705/14.72; 705/7.29; 705/7.33; 705/7.37

(58) Field of Classification Search ................ 705/14.41
See application file for complete search history.

(56) References Cited

U.S. PATENT DOCUMENTS 7,996,253 B2 * 8/2011 Reed et al. .................... 705/7.33
2009/0254420 A1 * 10/2009 Curd et al. ....................... 705/10
2010/0161738 A1 * 6/2010 Pascal et al. .................. 709/206

* cited by examiner

*Primary Examiner* — John Weiss
*Assistant Examiner* — Scott C Anderson
(74) *Attorney, Agent, or Firm* — Marc E. Hankin; Kevin Schraven; Hankin Patent Law, APC

(57) ABSTRACT

The invention is a computer-aided method of optimizing advertisements and content by grouping viewers into scientific segments, optimizing an advertisement and pieces of content by scientific segments, selecting an advertisement or content to display to a scientific segment, and creating a scientific targeted advertisement or piece of content.

1 Claim, No Drawings

SCIENTIFIC TARGETING FOR ADVERTISEMENT AND CONTENT SELECTION, DISTRIBUTION, AND CREATION

CROSS-REFERENCE TO RELATED APPLICATIONS

Priority is claimed to U.S. Provisional Patent Application Ser. No. 61/310,264, filed on Mar. 3, 2010, titled "Scientific Targeting for Advertisement Selection and Creation" by inventors Scott M. Kaufman, Jennifer L. Kushell, Russell J. Watson, Joshua T. Hoppes, Christopher J. Gooley, and William T. Han, the contents of which are expressly incorporated herein by this reference.

FIELD OF INVENTION

This invention relates to a method scientifically matching advertisements and/or content with consumers. More particularly, the invention relates to a computer-aided method to optimize advertisement and/or content selection and distribution, using scientific analysis of the viewer. It also provides a novel method to create more effective advertisements and targeted content, using scientific analysis, for a multitude of viewers in various viewer segments or groups.

BACKGROUND

For centuries advertisers and traditional media companies have been using tools, systems, and methods to try and reach and connect with the proper demographics that will purchase the goods and services being advertised. For example, many advertisers on television elect to advertise their products when a program is shown that will be viewed by the viewer segment, group, or demographic that is likely to purchase the advertised products. Recently, the long standing tools, systems, and methods of advertisers in print media, radio, and television have been altered by the shift of people getting their content from the Internet, rather than print media, radio, and television. Advertisers and media companies have struggled to adapt and many online advertisements are not reaching the desired viewer demographic, as mass content being created by traditional media companies is no longer connecting well with the interests of viewers seeking to consume more personalized and relevant content in a wide variety of online forms including but not limited to search results (e.g. Google.com®), news stories (e.g. CNN.com®), videos (e.g. YouTube.com®), photos (e.g. Flickr.com®), friend-generated postings (e.g. Facebook.com®), and blogs (e.g. perezhilton.com).

Online advertising and content generally has several parties involved in the process of displaying advertisements and content to viewers, with the three primary parties being the content publisher, the advertiser, and the advertising network. The content publisher is the owner of one or more websites which have some volume of visitors consuming content to whom the advertisements may be shown alongside (e.g. Facebook®, CNN®, AOL® and blogs) and who receives payment from the advertiser. The advertiser is the party who desires to create and display advertisements to viewers consuming the publisher's content (e.g. Toyota®, University of Phoenix®, and U.S. Army) and who provides payment to the content publisher. The advertising network or vendor serves to connect a multitude of content publishers with a multitude of advertisers (e.g. DoubleClick® and Advertising.com®) and is typically paid a portion of the monetary transaction between advertisers and publishers. Some very large content publishers, which may have millions or hundreds of millions of viewers, will often form their own advertising network to sell directly to the advertisers (e.g. Google® Advertising Programs, Yahoo!® Advertising Solutions, Microsoft® Advertising adCenter).

It is the advertising networks and the very large content publishers which use many of the varied methods, systems, and tools for determining which specific advertisement or content to display from the multitude of available advertisements and content libraries. The current methods for determining which specific advertisement or content to display from the multitude of available advertisements and content include using a simple analysis and segmentation of the viewer (e.g. the viewers' demographic or basic behavioral data on the potential viewers), analysis of the context (e.g. placing advertisements in locations with content related to the advertisement's content, as demonstrated by Google's® AdSense®), and/or cost optimization (e.g. observing which advertisements are the most cost effective or the most profitable to display, and then electing to display those advertisements at a disproportionally high frequency).

The first two above listed analysis methods are commonly referred to as "targeting." These methods are well known in the art and have been shown to improve the performance or effectiveness of advertisements and content. For example, an advertisement which aims to sell a subscription to a sports related magazine should, and frequently does, perform better when shown to viewers who frequent sports-related websites, who have in the past paid for premium sports television channels, or who currently have a subscription to a different sports related magazine. Additionally, content about the latest technologies being used effectively in high school education should, and frequently does, connect better when displayed to parents who have children near or within high school age, people with degrees in the field of education or executives of companies that develop technology applications.

Advertisers generally pay for online advertising in one of two ways. The first and longest-standing method is called Cost Per Impression ("CPM"). In the CPM method, the advertiser simply pays a set amount each time the advertisement is displayed to a viewer. Typically, a CPM is priced per thousand impressions, so a '$0.50 CPM" advertising campaign would cost the advertiser 50 cents for every 1000 displays of the advertisement. This method is analogous to offline advertising such as television, print media, and billboards where the price paid by the advertiser is related to the number of "eyeballs" that see the advertisement or view the content. For example, a thirty (30) second Super Bowl ad will cost an advertiser millions of dollars because that thirty (30) second advertisement will be seen by tens of millions of people. A second method for pricing online advertisements is called Cost Per Click ("CPC"). In the CPC method, the advertiser only pays when and if the viewer engages with the advertisement by clicking on the advertisement and linking to the advertisers' desired redirected location. The CPC method is usually priced per individual click. As such, "$0.50 CPC" advertising campaign or agreement would cost the advertiser 50 cents for each and every click that the advertisement receives. With the CPC method, no payment is made for mere passive viewing of the advertisement.

In recent years, improving the targeting methods and specificity has been a matter of significant research and development. Because an enormous amount money is spent in the advertising and content creation and distribution space, small optimizations have the power of scale to generate and/or conserve large sums of money. For instance in a CPC campaign, if an advertising network can increase the number of clicks or views which result from impressions, which is called the clickthrough rate, the advertising network can earn more money in the same period of time compared to if they had not improved the click-through rate.

Despite the significant resources spent on improving the targeting methods, significant improvement has not been achieved. Moreover, none of these improved targeting methods has utilized a scientific approach, a scientific analysis of the viewers, or a scientific analysis of the advertisements or content, to optimize advertising or content creation and delivery. Simply put, before the present invention, comparing advertisement or content performance across scientifically created segments of viewers to determine the best-performing segments for a particular advertisement or piece of content had never been done.

Finally, the concept and method of building a multitude of specifically scientifically targeted advertisements or pieces of content, using a knowledge base of scientific information, to optimally target each segment of viewers has also never been done.

Thus, there is a need for a computer-aided method that utilizes scientific analysis to identify what motivates and drives a viewer at their core to consume a particular piece of content and to pay attention, respond, and take action on a viewed advertisement. What is needed is a computer-aided method that segments the viewers, optimizes the advertisement or content creation, scientifically selects the advertisement or content to display, and creates a targeted advertisement or piece of content.

SUMMARY OF THE INVENTION

To minimize the limitations in the prior art, and to minimize other limitations that will become apparent upon reading and understanding the present specification, the present invention discloses a computer-aided method of optimizing advertisements and pieces of content, preferably on-line advertisements and content by using scientific information and analysis to segment viewers, optimize the advertisements and content, scientifically select the advertisements and content, and create a scientifically targeted advertisement.

One embodiment of the invention is a computer-based method for optimizing advertisements and content, comprising the steps of: grouping, on a computer, a plurality of viewers into one or more scientific segments; optimizing on a computer an effectiveness of an advertisement or piece of content and creating optimization data; selecting an advertisement or piece of content to be displayed to a scientific segment based on said optimization data; displaying said advertisement or content to said scientific segment; and creating a scientific targeted advertisement or piece of content by applying said optimization data to the creation of an advertisement for a selected scientific segment. The method may also include the step of: determining on said computer if said selected advertisement or content displayed was more or less effective than predicted and if less effective, re-optimizing on said computer an effectiveness of said selected advertisement or content.

Another embodiment of the invention is a computer-based method for optimizing advertisements and content or pieces of content, comprising the steps of: obtaining a plurality of scientific information about a plurality of specific viewers, wherein said plurality of scientific information is obtained for each individual viewer; processing said plurality of scientific information on a computer for each individual view; storing said processed scientific information on said computer; analyzing with said computer said processed scientific information; grouping said viewers into a plurality of scientific segments; storing said scientific segment information on computer by each individual viewer and each scientific segment; selecting and displaying a specific advertisement or piece of content to said plurality of specific viewers; obtaining and recording on said computer a plurality of performance data for said specific display of said specific advertisement or piece of content for each individual specific viewer; retrieving said scientific segment information for each individual specific viewer; determining on said computer an effectiveness of said specific advertisement or piece of content by scientific segment; determining on said computer on which scientific segments said specific advertisements or pieces of content are most effective; storing effectiveness data of said specific advertisement or piece of content by said scientific segment; determining or retrieving information for a specific viewer to whom said specific advertisement or piece of content will be displayed; retrieving said scientific segment information for said specific viewer; retrieving said effectiveness data of said specific advertisement or piece of content for said scientific segment in which said specific viewer is grouped; determining or predicting on said computer whether said specific advertisement or piece of content will be effective with respect to said specific viewer; displaying said specific advertisement or piece of content to said specific viewer; observing an effectiveness of said specific advertisement or piece of content on said specific viewer; determining on said computer whether said specific advertisement or piece of content was more or less effective than predicted; updating on said computer said effectiveness data of said specific advertisement or piece of content for said specific scientific segment in which said specific viewer is grouped with said observed effectiveness data, such that said determining or predicting of whether said specific advertisement or piece of content will be effective with respect to said specific viewer is improved; communicating via a computer network said effectiveness data to an outside computer; identifying a target audience of an advertisement or content distribution campaign; identifying said plurality of scientific segments within said target audience; selecting from said plurality of scientific segments one or more scientific segments for which a new specific advertisement or piece of content is to be created; obtaining a scientific understanding of said one or more selected scientific segments; retrieving pre-created data which is known to improve performance among said individual one or more selected scientific segments; applying via said computer said scientific understanding of said one or more selected scientific segments and said retrieved pre-created data to a design of said new specific advertisement or piece of content during a creation of said new specific advertisement; observing an effectiveness of said new specific advertisement or piece of content on said one or more selected scientific segments viewing said new specific advertisement or piece of content; recording on said computer said effectiveness of said new specific advertisement or piece of content on said one or more selected scientific segments viewing said new specific advertisement or piece of content; updating one or more algorithms for determining with said effectiveness data recorded.

Another embodiment of the invention is a computer-based method for segmenting viewers, comprising the steps of: obtaining a plurality of scientific information about a plurality of specific viewers, wherein said plurality of scientific information is obtained for each individual viewer; processing said plurality of scientific information on a computer for each individual viewer; storing said processed scientific information on said computer;

analyzing with said computer said processed scientific information; grouping said viewers into a plurality of scientific segments; storing said scientific segment information on computer by each individual viewer and each scientific segment; and retrieving said scientific segment information by individual or scientific segment.

Another embodiment of the invention is a computer-based method for optimizing an advertisement or specific piece of content, comprising the steps of: selecting and displaying a specific advertisement or piece of content to said plurality of specific viewers; obtaining and recording on said computer a plurality of performance data for said specific display of said specific advertisement or piece of content for each individual specific viewer; retrieving said scientific segment information for each individual specific viewer; determining on said computer an effectiveness of said specific advertisement or piece of content by scientific segment; determining on said computer on which scientific segments said specific advertisements or pieces of content are most effective; and storing an effectiveness data of said specific advertisement or piece of content by said scientific segment.

Another embodiment of the invention is a computer-based method for selecting an advertisement or specific piece of content, comprising the steps of: determining or retrieving information for a specific viewer to whom said specific advertisement or piece of content will be displayed; retrieving said scientific segment information for said specific viewer; retrieving said effectiveness data of said specific advertisement or piece of content for said scientific segment in which said specific viewer is grouped; determining or predicting on said computer whether said specific advertisement or piece of content will be effective with respect to said specific viewer; and displaying said specific advertisement or piece of content to said specific viewer. Preferably the computer-based method for selecting an advertisement or content also includes the steps of: observing an effectiveness of said specific advertisement or piece of content on said specific viewer; determining on said computer whether said specific advertisement was more or less effective than predicted; updating on said computer said effectiveness data of said specific advertisement or piece of content for said specific scientific segment in which said specific viewer is grouped with said observed effectiveness data, such that said determining or predicting of whether said specific advertisement or piece of content will be effective with respect to said specific viewer is improved; and communicating via a computer network said effectiveness data to an outside computer.

Another embodiment of the invention is a computer-based method for creating an advertisement or content (or piece of content), comprising the steps of: identifying a target audience of an advertisement or content distribution campaign; identifying said plurality of scientific segments within said target audience; selecting from said plurality of scientific segments one or more scientific segments for which a new specific advertisement or piece of content is to be created; obtaining a scientific understanding of said one or more selected scientific segments; retrieving pre-created data which is known to improve performance among said individual one or more selected scientific segments; applying via said computer said scientific understanding of said one or more selected scientific segments and said retrieved pre-created data to a design of said new specific advertisement or piece of content during a creation of said new specific advertisement or piece of content; observing an effectiveness of said new specific advertisement or piece of content on said one or more selected scientific segments viewing said new specific advertisement or piece of content; recording on said computer said effectiveness of said new specific advertisement or piece of content on said one or more selected scientific segments viewing said new specific advertisement or piece of content; and updating one or more algorithms for determining with said effectiveness data recorded.

The invention is a novel method to optimize advertisement and content creation and delivery to viewers, using scientific analysis of the viewer. The invention also provides a novel method to create more effective advertisements and pieces of content, using scientific analysis, for a multitude of viewers in various segments. By using scientific analysis of viewers to group them into one or more segments (scientific segments), it can be observed or determined which specific advertisements or pieces of content performs best with which scientific segments, and then advertisements and content can be shown solely or disproportionally more often to the one or more top-performing scientific segments of viewers. This in turn reduces wasted displays of a particular advertisement that would otherwise be shown to those scientific segments of viewers for whom the particular advertisement performs poorly. This also reduces wasted impressions serving a particular type of content that would otherwise be shown to those scientific segments of viewers for whom the particular content performs poorly. Performance, in this sense, may refer to the percentage of viewers who click on displayed advertisements or consumed the content, the percentage of viewers who both click on the displayed advertisement and then continue to perform some action (e.g. buying a product, signing up for a service or clicking through to view and consume more of the content), or any other method which may denote a successful or desirable outcome from the perspective of the advertiser or content publisher with respect to displaying the advertisement or piece of content.

In addition, by using scientific analysis of viewers, in a desired target audience for an advertiser, content publisher or within an advertisement or content distribution campaign, combined with specific scientific knowledge, advertisements and content may be created specifically to have performance which may be significantly higher when compared to advertisements or content created without this scientific knowledge and analysis. This process can be repeated for a multitude of segments within the desired target audience to obtain the most widespread and effective campaign performance across multiple scientifically-designed advertisements or pieces of content with the same goal in mind. For instance, if the goal of a particular advertisement is to sell a product, typically an advertisement would be created using text and/or graphic elements to appeal to the target audience. This particular advertisement may perform differently amongst scientifically segmented viewers in the target audience but using scientific knowledge of the particular scientific segments, an altered advertisement may be created for each scientific segment with different text and/or graphic elements in each case. Thus, the performance of a particular advertisement can be improved by creating and displaying the most effective altered advertisement to the scientific segment for which the advertisement was tailored. Additionally, if the goal of a particular piece of content is to inform people about next year's new line of automobiles being released by major car manufacturers, typically the content would be created using text and/or graphic elements to appeal to the target audience. This particular content may perform differently amongst scientifically segmented viewers in the target audience but using scientific knowledge of the particular scientific segments, altered versions of the content may be created for each scientific segment with different text and/or graphic elements in each case. Thus, the performance of a particular piece of content can be improved by creating and displaying the most effective altered piece(s) of content to the scientific segment for which the content was tailored.

The scientific analysis discussed herein may take many forms, including, but not limited to a test, assessment, or survey. The invention preferably includes four sub-methods: 1) segmentation of viewers; 2) optimization of advertisement or content display; 3) selection of an advertisement or content to display; and 4) creation of a scientific targeted advertisement or piece of content.

The segmentation of viewers sub-method preferably includes: obtaining scientific information about a specific viewer obtained through a multitude of means; a computer to analyze the scientific information into some intermediary form; a database where both the raw and intermediary scientific data is stored about a multitude of viewers, sorted by the individual viewer; an algorithm, run on a computer which groups specific viewers into a multitude of segments based on the intermediary scientific data and/or the raw scientific data; and an electronic communication process, by which separate system or computer can retrieve information about an specific viewer or a scientific segment of viewers.

The optimization of advertisement and content display method preferably includes the steps of: providing performance data for the display of a specific advertisement or piece of content to a specific viewer; providing the scientific segment information about that specific viewer; an algorithm run on a computer to determine which scientific segments provide the highest performance for specific advertisements or pieces of content; a database to store this optimization data for specific advertisements or content; an electronic communication process by which a secondary system or computer can retrieve stored analysis data on the performance of the analyzed advertisements and pieces of content.

The selection of an advertisement or content to display to a viewer preferably includes the steps of: identifying a viewer to be shown an advertisement or piece of content; identifying via a computer information about that viewer, including that viewer's scientific segment information; application by a computer of an algorithm to determine the highest-performing advertisement or content to display to the identified viewer, based on the viewer's scientific segment and (preferably) other scientific data; observation and storage of performance data for the specific advertisement or piece of content displayed, which may be used as input back into the methods for continuous optimization of the advertisement and content;

The creation of a scientific targeted advertisement or content creation method preferably includes the steps of: providing segmentation information about the multitude of viewers to whom the advertiser or content publisher desires to display an advertisement or piece of content; providing a scientific understanding and/or pre-existing data and knowledge about the target scientific segments; applying scientific information for the scientific segments for the design of a multitude of advertisements and pieces of content; recording the performance of the multitude of advertisements and content and feeding the recorded data back into the methods to further optimize the advertisements and pieces of content.

It is an object of the present invention to overcome the limitations of the prior art.

Another object of the present invention is to provide a computer-aided method of using scientific analysis and data to optimize the effectiveness and performance of an advertisement or piece of content.

This method is innovative because no current system, method, or apparatus combines the scientific analysis of viewers with the creation of advertising and content to optimize the display of advertisements and content to viewers.

DETAILED DESCRIPTION OF THE INVENTION

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot figures, and the detailed descriptions thereof, are to be regarded as illustrative in nature and not restrictive. Also, the reference or non-reference to a particular embodiment of the invention shall not be interpreted to limit the scope of the invention.

In the following description, certain terminology is used to describe certain features of one or more embodiments of the invention. For instance, "computer" refers to any device that processes information with an integrated circuit chip, including without limitation, mainframe computers, work stations, servers, desktop computers, portable computers, laptop computers, embedded computers, wireless devices including cellular phones, personal digital assistants, and portable game players, and hand-held computers; "internet" refers to any collection of networks using standard protocols, whether Ethernet, ATM, FDDI, Wi-fi, Token ring, or any combination thereof; and "website" refers to any document written in a mark-up language including, but not limited to, HTML (hypertext mark-up language) or VRML (virtual reality modeling language), dynamic HTML, XML (extensible mark-up language), WML, or any other computer languages related thereto, as well as to any collection of such documents reachable through one specific Internet Protocol Address or at one specific World Wide Web site, or any document obtainable through any particular URL (Uniform Resource Locator); and "web page" (or "page") refers to any of the various documents and resources on the World Wide Web, in HTML/XHTML format with hypertext links to enable navigation from one page or section to another, or similar such resources used on the internet.

In the scope of this invention, the concept of scientific analysis refers to the information gathering and valuation methods related to the various disciplines of behavioral science where behavioral science is defined as a discipline in which the actions and reactions of humans are studied through observational and experimental methods. Such disciplines include psychology, psychiatry, sociology, axiology and philosophy, for instance. Other scientific fields, such as genetics, which deal with individual DNA attributes and personal genome information, may also be used as the basis of this scientific analysis. One embodiment of this type of genetic scientific analysis which may be used in this invention is the Personal Genome Service™ offered by 23andMe.com that analyzes your DNA and provides genotyping of an individual's DNA along with information and tools for consumers to learn about and explore their DNA. Another example of a type of scientific analysis which may be used in this invention is Industrial and Organizational Psychology. In this field of study, which is generally defined as the scientific study of the relationship between an individual and work, various categories of analysis can be performed to provide the scientific information and segmentation algorithms which are used by this invention. The study and measure of work motivation, ethics, decision making, and personality fall into this category of Organizational Psychology. Another example of a related type of scientific analysis which may be used in this invention is Value theory, which refers to the study of the manner in which human beings develop, assert and believe in certain values, and act or fail to act on them.

One embodiment of an assessment which provides scientific information and analysis of a specific user is the Humantelligence™ Multi-lens Scientific Instrument, which combines measurement of three scientific perspectives of a user: workplace values & motivators, operating style, and ideal job culture. Another embodiment of such an assessment is the Myers-Briggs Type Indicator (MBTI) questionnaire, which is in common use for measurement of psychological preferences in how people perceive the world and make decisions.

"Scientific segment" refers to any grouping of individuals based upon some measurement or observation of human behavior or characteristics obtained in a reproducible manner. The term "scientific raw data" refers to any information directly gathered in the process of measuring or observing human values, behaviors, characteristics or genetics. The term "intermediary scientific data" refers to any information which is derived from raw scientific data, and which results in data that is in a more useful form. "Scientific characteristic" is a distinguishing human feature or quality which either is itself observable behavior or is the cause of observable behavior, whether conscious or subconscious, overt or covert, voluntary or involuntary.

Examples of intermediary scientific data, include, but are not limited to: binary data (the person either IS or IS NOT), which includes Myers-Briggs Personality Types (person is INTP (Introversion, iNtuition, Thinking, Perception) and personality types ("Type A" or "Type B" personality); and variable strength data (usually expressed as numerical value in a range of non-existent to maximum-possible-strength), which includes Motivators/Values (e.g. Helping=23, Influence=14, Knowledge=34, Structure=12, Money=28, Uniqueness=32), DISC Behaviors or "Operating Style" (People=15, Problems=39, Patience=12, Procedures=16), and ideal job culture behaviors (People=15, Problems=39, Patience=12, Procedures=16).

Other data (may be binary or variable strength) includes Genetics (existence of certain genes to provide insights into your personal health traits including risk factors for over 90 diseases) and Psychiatry (diagnosis of some condition or disorder).

Scientific segments are preferably based upon and defined by the intermediary data. For example, a segment may be created containing people who:
 are the Myers-Briggs personality type INTP
 are "Type A" personalities
 have Helping as their dominant value
 have a numerical strength between 15 and 20 in the Helping value
 have Problem Solving as their dominant DISC behavior
 have a numerical strength between 15 and 20 in the Problem Solving DISC behavior
 exhibit the gene for dyslexia
 have been diagnosed with multiple-personalities disorder
 have been diagnosed with paranoia Segments may also be created from combinations of other segments to form compound segments.
 For example, a segment containing people who:
 are Myers-Briggs personality type INTP and have Helping as their dominant value and People as their dominant DISC behavior
 exhibit a gene for Alzheimer's and have Myers-Briggs personality type ENTJ What the scientific raw data is will depend on the method of measuring or observing the scientific characteristics. If that method is a survey or assessment, the raw data would be the collection of answers given by the viewer. Each question may have zero or more answers given by the viewer, depending on the form of the survey or assessment. If the method is an exam performed by a professional such as a physician or psychiatrist, the raw data may include notes (standardized or not) and/or a final diagnosis. If the method is a genetic test, the raw data may be genetic sequencing information or a collection of all detected characteristics or genes.

The scientific characteristic will exactly correlate to the scientific intermediary data because the intermediary data is preferably a measure of existence/strength of the scientific characteristics.

An effective advertisement or advertisement campaign is an advertisement or advertisement campaign which generates more value (increased revenue or brand awareness, good will, etc.) than the cost to create and run. Typically, cost is in terms of money.

An effective piece of content or content distribution campaign is a piece of content or content distribution campaign which generates more value (new subscribers, sharing with others, good will, etc.) than it costs to create. Typically, cost is in terms of time and money to create a piece of content.

In the scope of this invention, the display of advertisements may come in many forms. Common online advertisement methods include but are not limited to search engine results advertisements, banner advertisements, rich media advertisements, social networking advertisements, interstitial or popup advertisements, video advertisements and e-mail marketing. Any of these advertisements may be optimized or created using the methods in this invention. In general, any advertisement for which the viewer can be identified and a metric of performance can be determined can utilize this invention to optimize performance. Even among advertisements for which objective performance cannot be determined or measured, the method of optimizing advertisements created as described in this invention can still be utilized to great effect, including advertising for television broadcasts and rebroadcasts, newspapers, magazines, books (both paper and electronic), videotapes, CDs, and DVDs and other offline media advertisements.

In the scope of this invention, the display of content may come in many forms. Common online forms of content include but are not limited to search engine results, social networks, videos, photos, games, audio files, e-mails, newsletters, blogs. Any of these forms of content may be optimized or created using the methods in this invention. In general, any content for which the viewer can be identified and a metric of performance can be determined can utilize this invention to optimize performance. Even among pieces of content for which objective performance cannot be determined or measured, the method of optimizing advertisements created as described in this invention can still be utilized to great effect, including advertising for television broadcasts and rebroadcasts, newspapers, magazines, books (both paper and electronic), videotapes, CDs, and DVDs and other offline forms of content.

Segmentation of Viewers. The goal of segmenting viewers is to create segments of viewers, based on their scientific attributes, which can be used for one or more subsequent methods. The method of segmenting viewers is preferably performed on a computer and includes:

1. Obtaining raw scientific data about a viewer by that viewer completing some action, or other means;
2. If desired, the raw data is processed into intermediary scientific data, which can be used to make determinations about the scientific characteristics of the viewer;
3. storing scientific data sets and associating the obtained information about the viewer
4. repeat the above steps for as many viewers as desired;
5. segmenting the viewers into one or more groups via one or more computer based algorithmic processes, which use the intermediary or raw scientific data;
6. storing the resulting groupings in a database for later retrieval.

Raw scientific data in step 1 above may take many forms, including the viewer's specific answers to questions based in scientific theory. The viewer action in step 1 may be an assessment, survey, questionnaire such as the Myers-Briggs Type Indicator assessment, or the Humantelligence™ Multi-lens Scientific Instrument. It may also be based on observation of action trends for a specific viewer which imply certain scientific results as could have been obtained by directly asking the viewer.

In some cases, it may be infeasible or impossible to gather identifiable raw scientific data for each viewer in to whom an advertiser or content publisher desires to display an advertisement or piece of content. A process of inferring scientific segments based upon observation of other viewer data trends is possible. By using commercially relevant data-mining methods on a database of sufficient size which contains raw and/or intermediary scientific data and other viewer-linked data for a representative subset of the target audience, correlations can be determined between general scientific segments and more easily measured or observed data (e.g. behaviors, demographics, or clickstream data). While these inferred scientific segments will not be as strong or reliable as actual, measured scientific data from a specific viewer, it will provide substantial differentiation among segments in overall populations. When using this alternate process for segmentation, it is assumed that when subsequent methods (such as optimization, display and creation) retrieves scientific segment data for a specific viewer, the segmentation method will first attempt to return specific scientific segments for that specific viewer if available and, failing that, will return inferred scientific segments if available.

The optional processing in step 2 is required when the raw data obtained in step 1 cannot be directly used to make determinations about the scientific characteristics of that viewer. In some cases this process may be called "scoring." For instance if the raw data in part 1 has a multitude of questions that affect the result on a single characteristic, those questions may need to be combined into a single result. In a simple example, this could simply be a summation of answers which indicate each measured characteristic. It may also be a more advanced statistical process to generate the intermediary data.

Identifiable information about the viewer in step 3 can take many forms, including an email address or viewer name, internet cookie, or some other type of generated unique identifier. Uniquely identifying the viewer is required so that future advertisements and content may be shown to identified viewers based on their scientific segment. Storage of the scientific data sets and viewer identification in step 3 will be in a computer database, or some other electronic storage-and-retrieval machine.

The purpose of the algorithmic process in step 4 is to place viewers in meaningful scientific segments which can then later be used for targeting and creation of advertisements and content. An algorithm used in this step may be tightly related to the type of scientific data used in steps 1 and 2, and which may incorporate special knowledge provided by the creator of the action in step 1. For example, if step 1 utilizes an assessment instrument which identifies what motivates the viewer, the scientist who created the instrument may specify that certain types of groupings will best take advantage of the viewer motivation data. The algorithms may also be a generic statistical analysis to identify relevant groupings of viewers from the scientific data. Step 4 may occur each time an outside method requests segmentation information about a viewer or group of viewers, or if appropriate, the results may be stored as discussed in step 5 for quick retrieval without repeated computation.

Optimization of Advertisement and Content Display.

The goal of this sub-method is to determine which specific advertisements or content perform best among which specific viewer segments. Using empirical observation in this manner (when appropriate statistical significance is obtained), future performance of each specific advertisement and piece of content can be predicted. Future viewers who are in the same scientific segment as the previous high-performing viewers can be predicted to have a similar performance, even though those future viewers are not included as part of the original analysis.

The method of optimizing an advertisement or piece of content is a computer aided process that preferably includes:

1. Selecting and displaying a specific advertisement or piece of content to a multitude of viewers.
2. Recording the effectiveness or performance and display data for each specific display of the specific advertisement or piece of content to each specific viewer
3. Retrieving the scientific segments for each specific viewer to whom the advertisement or content is displayed.
4. Determining via an algorithm on a computer those segments that have the highest performance for the specific advertisement or piece of content (called the optimization data).
5. Storing the above optimized data for later retrieval
6. Repeating Steps 1-5 for each specific advertisement or piece of content for which optimization data is desired.

An example of an advertisement or piece of content going through the process will allow a better understanding of this sub-method. An advertisement for a Widget (a fictional consumer product) or the beginning of piece of content about a Widget (article excerpt) could be shown to a selection of 1000 viewers who have been grouped into two scientific segments, A and B. Of the 1000 viewers, 500 are in segment A and 500 are in segment B. If it is observed that 300 viewers click on the advertisement or link to view more of the article and of those who click, 50 are in A and 250 are in B, it is reasonable to hold that the advertisement or content performs more highly (or better) with segment B, wherein 50% of the viewers clicked the advertisement or article link, than with segment A, wherein only 10% clicked. If a separate group of 1000 segment B viewers view the same Widget advertisement or article excerpt, based on the empirical data, it may be expected that the advertisement or article will receive 500 clicks. This 500 clicks per the second group of 1000 viewers is greater than the 300 clicks per the first group of 1000 viewers. This increase in clicks per set of viewers demonstrates an optimized result. In other words the same advertisement or content was displayed the same number of times, but there were more clicks in the optimized grouping.

The specific advertisement or content in Step 1 is typically chosen from a collection of advertisement or content inventory that is provided by the advertising network or directly by the content publisher. Preferably the optimization method is done for all advertisements or content in the inventory so that complete optimization data is obtained.

The multitude of viewers in Step 1 can be chosen using a variety of methods, the most simple of which would be a random distribution of viewers across all content publisher sources. Viewers may also be chosen in order to evenly distribute the advertisement and content displays across the full spectrum of scientific segments, so that the optimization can occur with the fewest required advertisements or pieces of content displayed. Viewers may further be chosen to be evenly distributed across the expected target audience's scientific segments for a particular advertisement or piece of content. Viewers may also be chosen based upon some relevant external data or factor such as geographic location or income.

Performance and display data in Step 2 may include: when the advertisement or content was displayed; whether or not the specific viewer clicked on or otherwise interacted with the advertisement or content; whether or not the specific viewer both clicked on the advertisement or content and subsequently completed some desired action; the context of the website on which the advertisement or content was displayed, and/or other various indicators of advertisement or content performance.

The purpose of the algorithm in Step 4 is to analyze the aggregated performance data across each scientific segment to determine where the highest performance occurs. An example of a simple algorithm that could perform this function might calculate summations within each segment's performance data, including the number of displays and the number of clicks. A more complex optimization algorithm may also consider other factors, such as time of day or website context, to improve accuracy and reduce false conclusions.

Optimization data preferably includes a collection of scientific segments for which the performance of each specific advertisement or piece of content is higher than average, but may also include other information which can be used to further optimize display of each advertisement or piece of content. For instance, this other optimization information may specify that an advertisement or piece of content performs best to certain scientific segments, but only when presented in a certain context.

Selection of Advertisement or Piece of Content to Display

The goal of this sub-method is to select the most effective advertisement or piece of content to display to a specific viewer based upon that specific viewer's scientific segment.

The method of selecting an advertisement or content to display is a computer aided process that preferably includes:
1. Determining the identifiable information for a specific viewer to whom an advertisement or content is desired to be displayed.
2. Retrieving the scientific segment(s) for the specific viewer, as discussed in the segmentation of viewers sub-method above.
3. Retrieving the optimization data for the specific scientific segment(s) of the specific viewer, as discussed in the optimization of advertisement or content sub-method above.
4. Optionally, but preferably, retrieving additional or other information, such as inventory information for available advertisements or content, or traffic data for publishers.
5. Determining, via a computer based algorithm, which specific advertisements or pieces of content are most optimal to display to the specific viewer.
6. Communicating to an external process, system, or computer, the optimal advertisements or pieces of content so that this information may be used for final selection of the specific advertisement(s) or specific content to display.
7. Storing data for this specific display of this specific advertisement or content to this specific viewer and using the stored data to optimize the system, as discussed in the optimization of advertisement or content sub-method above.

Identifiable information in Step 3 may be the same or similar as the identifiable information in Step 3 of the Segmentation of Viewers sub-method, wherein the most likely form of information is an internet cookie, which provides for tracking ability for an advertising network or content publisher to uniquely identify specific viewers across a multitude of online mediums and destinations.

The optional additional information in Step 4 may include inventory counts of how many remaining displays or clicks have been purchased for each advertisement or piece of content, historical distribution of scientific segments across publisher websites, traffic volume information for publisher websites, or other status information and metrics data.

The purpose of the algorithm in Step 5 is to deliver an ordered list of the most optimal specific advertisements or pieces of content to display to the specific viewer's scientific segments. In its simplest form, an algorithm to satisfy this requirement may compute the ratio of displays to clicks (from the optimization data) for each and every advertisement or piece of content and return an ordered list from highest click through rate to lowest. A more complex algorithm may also consider the relationship between multiple scientific segments and the available inventory information from Step 3, to better distribute high-performing advertisements or content across a variety of scientific segments. For instance, if a specific scientific segment "X" is associated with high-performing advertisements or pieces of content A, B, and C, and specific scientific segment "Y" has only high-performing advertisement or piece of content A, an advanced Step 5 algorithm may not include advertisement or piece of content A for segment "X" because segment "X" has two alternate high-performing advertisements or pieces of content that may be displayed, while segment "Y" has only advertisement or piece of content A that performs well. Therefore, the algorithm may conserve displays of advertisement or piece of content A for use with scientific segment "Y". Depending on the information available, there are many types and kinds of Step 5 algorithms that may be employed.

The communication in Step 6 may occur via an Application Programming Interface across a multitude of communication mediums such as Internet Protocol (IP). It may also occur via binary communication in physical memory on a single server between multiple processes.

The recursive feedback loop in Step 7 provides an additional preferred ability for the Segmentation of Viewers sub-method, the Optimization of Advertisement or Piece of Content sub-method, and the current sub-method, to continuously incorporate new performance data in order improve the overall optimization process. Because the basis of the Optimization of Advertisement or Piece of Content to Display sub-method is preferably empirical observation of performance across scientific segments, the prediction process may also be improved via further empirical observation of the results of the prediction process.

Creation of Scientific Targeted Advertisement or Content (or Campaign)

The goal of this sub-method is for an agent to create an advertisement or content or a multitude of advertisements or pieces of content, also called an advertisement or content distribution campaign, to achieve a certain goal, where each individual advertisement or piece of content preferably includes some variation(s) in order to improve performance among a specific scientific segment through scientific understanding.

The method of creating a scientific targeted advertisement or piece of content preferably is comprised of the Steps of:
1. Identifying an overall target audience of the campaign
2. Identify those scientific segments which exist in the overall target audience
3. Selecting those scientific segments for which a specific advertisement or piece of content is to be created
4. Obtaining a scientific understanding of one of the selected scientific segments
5. Optionally, but preferably, retrieving pre-created data that is known to improve performance for the selected scientific segments
6. Applying the scientific understanding and, preferably, the pre-created data which is known to improve performance for the selected scientific segments to the design and creation of a specific advertisement or piece of content.
7. Repeat Steps 4-6 for each scientific segment selected in Step 3.
8. Displaying the one or more selected and optimized advertisements or pieces of content alone or as part of a campaign.
9. Optionally, but preferably, obtaining optimization data for each specific advertisement or piece of content.
10. If the obtained optimization data indicates performance to the targeted scientific segment is not satisfactory, Steps 4-7 are repeated for each specific advertisement or piece of content to make improvements until desired performance is obtained.

The agent which performs this process may be a person skilled in the art of advertisement design, an automated tool, or a combination of an unskilled person and an automated tool.

The overall target audience in Step 1 may be "everyone" or may be a more specific audience that the advertiser or content publisher desires to reach. It may be limited by many factors, such as geographic location or income ranges. The purpose of this identification is to avoid wasted work by creating advertisements or content for viewers who are outside the desired audience.

Identification of scientific segments in Step 2 may be obtained by retrieving and aggregating scientific segment information from Steps 4 and 5, of the Segment Viewers sub-method described above, for all known specific viewers in the target audience. If insufficient data is available scientific segment, a process is preferably initiated to gather sufficient scientific data from the target audience.

The scientific understanding in Step 4 may be obtained through various means, including classes, books, lessons, or online knowledge bases. If the agent is a person, the understanding will more likely be obtained through a teaching or training process administered by an expert in the subject of scientific understanding. If the agent is an automated tool, this understanding will most likely be obtained by accessing an online knowledge base populated with information created by or under the direction of an expert in the subject of scientific understanding.

Pre-created data in Step 5 may include text, images, colors, shapes or other design elements, organized by scientific segment, which elicit a certain desire in the viewer to act in a manner which is desired by the advertiser or content publisher. For example, text and images may be selected which, because of their scientific significance, induce a viewer to click an advertisement or link to view more of an article link. This pre-created data may be explicitly created by an expert or may be compiled over time based upon empirical observation of a specific data record's performance among particular scientific segments.

The creation of the specific advertisement or piece of content in Step 6 is then undertaken by the agent, taking into account all applicable gathered scientific understandings and pre-created data. Preferably the agent is a computer program or a computer is used to aid the agent. Non-scientific factors may be also be used in this creation Step, including aesthetic design factors and other design rules and expertise as may be available to the agent.

An example of how an automated agent would be used in this method is a scientifically targeted email campaign, wherein the overall messaging is defined, but the automated process creates a multitude of different email messages (i.e. advertisements or specific pieces of content) based upon replacing a placeholder, such as the subject of the email with pre-created data.

Optional Steps 9 and 10 allow for feedback optimization by using each created advertisement or piece of content as input to the optimization method process (as discussed above in Step 2 of the Optimization of Advertisements and Content) to confirm that the advertisement actually has a high, if not the highest, performance among the targeted scientific segment. This optimization process is analogous to a test screening for a film, where the near-final product is displayed to the desired audience and feedback is gathered to allow for additional improvements before finalization, which should result in a higher-quality end product. However, the optimization process may be omitted for a variety of reasons, including test feasibility or economic reasons without changing the scope of the invention. Preferably the feedback optimization includes updating any and all algorithms and optionally updating any pre-created data so that the methods are more predictable and better optimized.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

What is claimed is:

1. A computer-based method for optimizing advertisements and content, comprising the steps of:
obtaining a plurality of scientific information about a plurality of specific viewers,
wherein said plurality of scientific information is obtained for each individual viewer;
processing said plurality of scientific information on a computer for each individual view;
storing said processed scientific information on said computer;
analyzing with said computer said processed scientific information;
grouping said viewers into a plurality of scientific segments;
storing said scientific segment information on said computer by each individual viewer and each scientific segment;
selecting and displaying a specific advertisement or piece of content to said plurality of specific viewers;
obtaining and recording on said computer a plurality of performance data for said specific display of said specific advertisement or piece of content for each individual specific viewer;
retrieving said scientific segment information for each individual specific viewer;
determining on said computer an effectiveness of said specific advertisement or piece of content by scientific segment;
determining on said computer on which scientific segments said specific advertisements or pieces of content are most effective;
storing effectiveness data of said specific advertisement or piece of content by said scientific segment;
determining or retrieving information for a specific viewer to whom said specific advertisement or piece of content will be displayed;
retrieving said scientific segment information for said specific viewer;
retrieving said effectiveness data of said specific advertisement or piece of content for said scientific segment in which said specific viewer is grouped;
determining or predicting on said computer whether said specific advertisement or piece of content will be effective with respect to said specific viewer;
displaying said specific advertisement or piece of content to said specific viewer;
observing an effectiveness of said specific advertisement or piece of content on said specific viewer;
determining on said computer whether said specific advertisement or piece of content was more or less effective than determined or predicted;
updating on said computer said effectiveness data of said specific advertisement for said specific scientific segment in which said specific viewer is grouped with said observed effectiveness data, such that said determining or predicting of whether said specific advertisement or piece of content will be effective with respect to said specific viewer is improved;
communicating via a computer network said effectiveness data to an outside computer;
identifying a target audience of an advertisement or content distribution campaign;
identifying said plurality of scientific segments within said target audience;
selecting from said plurality of scientific segments one or more scientific segments for which a new specific advertisement or piece of content is to be created;
obtaining a scientific understanding of said one or more selected scientific segments;
retrieving pre-created data which is known to improve performance among said one or more selected scientific segments;
applying via said computer said scientific understanding of said one or more selected scientific segments and said retrieved pre-created data to a design of said new specific advertisement or piece of content during a creation of said new specific advertisement or piece of content;
observing an effectiveness of said new specific advertisement or piece of content on said one or more selected scientific segments viewing said new specific advertisement or piece of content;
recording on said computer said effectiveness of said new specific advertisement or piece of content on said one or more selected scientific segments viewing said new specific advertisement or piece of content;
updating one or more algorithms for determining with said effectiveness data recorded.

* * * * *